Jan. 20, 1931.  L. P. SCHWEITZER  1,789,452
METHOD OF MANUFACTURING PAPER
Filed Oct. 24, 1928
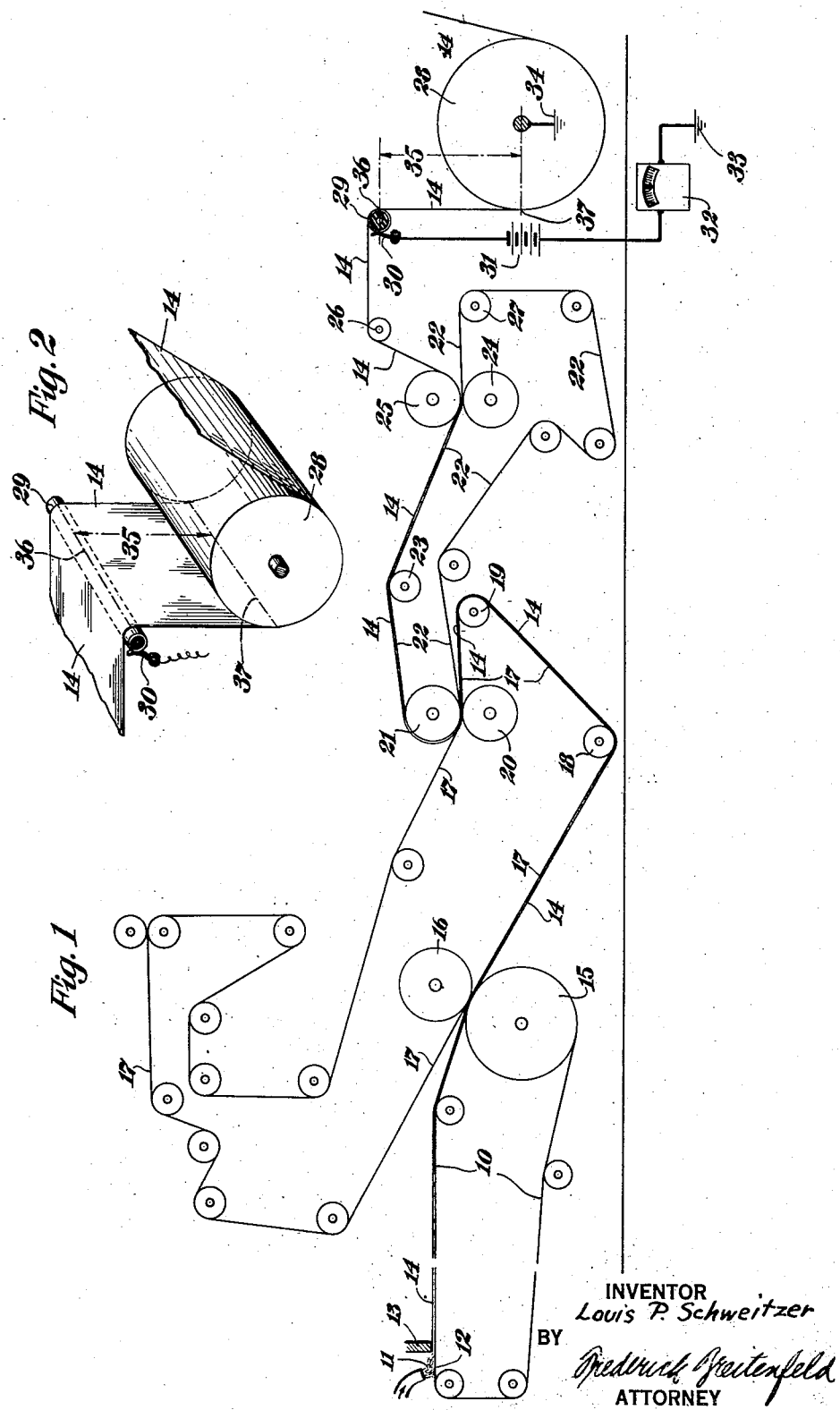
INVENTOR
Louis P. Schweitzer
BY
Frederick Freitenfeld
ATTORNEY Patented Jan. 20, 1931

1,789,452

UNITED STATES PATENT OFFICE

LOUIS P. SCHWEITZER, OF NEW YORK, N. Y.

METHOD OF MANUFACTURING PAPER

Application filed October 24, 1928. Serial No. 314,638.

My present invention relates generally to paper manufacture, and has particular reference to a method of continuously measuring and controlling the weight of the paper produced.

Before proceeding to describe my invention in detail, I will premise that the paper manufacture to which my invention has reference involves the employment of a machine, such as a fourdrinier, wherein a mass of paper stock, consisting of finely comminuted pulp fibers and a liquid suspending medium therefor, is poured continuously upon a receiving end of a wire screen so as to form a web thereon. This web embodies a great excess of the liquid medium, which is usually water and will be referred to hereinafter as water, and the machine subjects this web to successive steps serving to remove practically all of the water. The water-removing apparatus is of two types, a mechanical type and a thermic type. Thus, the web is first subjected to a number of felts and press rolls and is finally subjected to a series of heated rolls, the completed paper being wound upon a receiving drum.

In the manufacture of paper for certain purposes, such as for use as insulating layers in paper-dielectric condensers, it is of the utmost importance that the weight of the paper remain substantially uniform. For example, a so-called "four-pound" paper must be almost exactly four pounds per given length throughout the roll, since variations might render the paper unusable to meet the accurate requirements of certain condensers. The fact that condenser manufacturers may in certain cases call for and require a four-pound paper, and may in other cases specify a five-pound paper, indicates that slight variations in weight are accompanied by variations in dielectric properties, and necessitates an accurate control of weight from the standpoint of the paper manufacturer.

Heretofore, an attendant has at specified intervals torn a section from the paper being wound upon the drum at the end of the machine. This section was then accurately cut to a predetermined size and actually weighed to test whether the desired uniformity of weight was being maintained. In addition to the extra time, labor, and annoyance involved, the complete continuity of the paper roll was thus destroyed. Furthermore, variations in weight were frequently detected only after considerable lengths of the undesired or inaccurate weight had been completed, thus resulting in considerable wastage.

It is an object of my present invention to provide a novel method for continuously measuring and also controlling, in an accurate manner, the weight per given length of the paper being manufactured.

Obviously, weight variations may be due to variations in pulp concentration as the stock is initially poured onto the wire screen, or they may be due to variation in speed of the wire screen receiving the stock. If the pulp concentration and the speed of the screen could be accurately maintained uniform, the resultant paper would be accurately uniform. Unfortunately, it is practically impossible to control the pulp concentration to the required degree of accuracy. Accordingly, in accordance with my invention, I provide means for altering the speed of the wire screen in a predetermined manner and by predetermined amounts as and when the result of the continuous measuring indicates that an adjustment is necessary.

My invention employs the electrical conductivity of the web. Since the pulp content is practically nonconductive, whereas the water content is a good conductor, it is not surprising to find that the electrical conductivity of the web has heretofore been resorted to for other purposes, and therefore I do not make any claim, broadly, to the step or steps of making use of such electrical conductivity. However, the purposes for which such electrical conductivity has heretofore been employed are of an entirely different character, and are based upon assumptions which are either not well founded or which result from an unthorough appreciation of the true nature and characteristics of the paper web and the effects upon it of the procedural steps outlined hereinabove. My present invention is premised upon certain peculiarities and distinctive phases of the web and the water-removing procedure as proven to me by actual experimentation in actual practice, and set forth more fully hereinafter.

Thus, I have ascertained that pulp fibers of a given grade and character have a predetermined constant water-carrying capacity, and that the water thus entrained or held in absorption by virtue of this capacity cannot be expelled by merely mechanical means. This contention is substantiated by the customary provision of two types of water-removing means, viz., the mechanical devices and the thermic devices.

Analysis has therefore shown that the constituency of the stock initially fed to the wire screen is as follows: (a) pulp fibers, (b) a predetermined amount of water entrained thereby by virtue of the inherent and constant water-carrying capacity, and (c) a great excess of water carried along between and around the fibers. The passage over the wire screen results in the removal of a considerable amount of the excess water. The passage through one or more press rolls (usually two, but sometimes three) squeezes out an additional amount of excess water. I have definitely ascertained, however, that this mechanical removal of water is powerless to remove any more than the excess referred to as "(c)" above. For example, whereas two press rolls are usually employed, I have found that an additional press roll is effective to remove only a negligible further amount of water, if any. In other words, as long as the press rolls are normally efficient and reasonably sufficient in number to effect a complete expulsion of the excess water, a stage is reached where further mechanical expulsion is ineffective. At this stage, the ratio of water to pulp content is a fixed predeterminable amount dependent solely upon the grade and nature of the pulp fibers. It is a full appreciation of this critical stage of the procedure upon which the successful results of my invention have been predicated.

Briefly, my invention resides in continuously measuring an electrical property, preferably the resistance, of a predetermined area of the web at this critical stage of its travel and treatment. Since the pulp is a non-conductor, the resistance is directly proportional to the amount of water in such area; and since this amount of water bears a predetermined relationship to the amount of pulp in such area, a measurement of the resistance serves as a measurement of the amount of pulp distributed over such area and hence of the weight per given length of the paper ultimately produced.

I cannot stress too strongly the importance of the foregoing critical stage in the process. Bearing in mind the initial constituency of the stock poured upon the screen, it is evident that any measurement made prior to the arrival at such critical stage will be utterly unreliable and valueless, because the water content of the web then includes a certain variable and indeterminate portion of the excess referred to above by "(c)". Similarly, any measurement made subsequent to such critical stage will be equally valueless because the water content of the web will then be some indeterminate proportion of the entrained water referred to by "(b)" above, the heat treatment having commenced its action of driving off such entrained water.

For the attainment of the foregoing objects and such other objects as may hereinafter appear or be pointed out, I have arranged a satisfactory mechanism whereby my invention may be carried into effect, such mechanism being shown in the accompanying drawings in connection with a typical paper-making machine, such machine being shown only by way of example. In the drawings—

Figure 1 is a diagrammatic elevational view of a paper machine showing the initial formation of the paper web and its advancement up to and through the critical stage hereinbefore referred to; and Figure 2 is a fragmentary perspective view of a suitable arrangement at this critical stage for carrying my invention into effect.

A continuously traveling wire screen 10 receives the mass of liquid stock 11 at a point 12. At the expense of repetition, it is pointed out that this stock consists of three constituent parts, (a) pulp fibers, (b) a predetermined and constant amount of water bearing a direct relationship to the amount of pulp and entrained by the latter by virtue of the inherent water-carrying capacity of the pulp, and (c) a great excess of additional water.

This mass passes under a doctor or slicer 13 which spreads the same over a predetermined and fixed width, thereby initially forming the web 14 upon the screen 10. A certain portion of the excess water is removed during the advancement of the web along the screen 10.

Presently the screen 10 passes over a roll 15 arranged in close relationship to a roll 16. Passing beneath the latter is a felt web or belt 17, the latter being brought into contact with the web 14 during the passage of the latter between the rolls 15 and 16.

As a result of the comparative dryness of the felt 17, the web 14 is transferred from the screen 10 to the felt 17 and is carried on the underside of the latter during its passage around the guide rollers 18 and 19.

Presently the felt 17 passes between the first press rolls. It passes over the lower roll 20 and beneath the upper roll 21. In passing through these press rolls, the web 14 is brought into contact with a second felt 22, and due to the relative dryness of the latter, the web 14 is transferred to the felt 22 and is carried on the upper surface thereof during the passage of the felt 22 over the guide roller 23.

Presently the second press rolls are passed through, the felt 23 passing over the lower roll 24 and beneath the upper roll 25.

In the machine illustrated, no further felts are encountered, and the web 14, now self-sustaining, is directed upwardly over a guide roller 26, the felt 22 continuing by itself over the guide roller 27 and thence back to the first press rolls.

The web 14 has now arrived at the critical stage in the process, and is presently to be subjected to the thermic treatment indicated by the first heat roll 28. In other words, the mechanical expulsion of water thus far effected has exhausted its capabilities, and the constituency of the web approaching the roller 26 consists solely of (a) the pulp fibers, and (b) the predetermined amount of water entrained by such fibers solely by virtue of their inherent water-carrying capacity. I have found this constituency to exist under normal day by day and week by week conditions and regardless of any special precautions or regulations relating to the fine adjustment of the efficiencies of the first and second press rolls. In other words, assuming the machine to be operating in its normally efficient manner, the particular dryness or relative dryness of the felts and the particular relative efficiencies of the press rolls is immaterial so far as the constituency of the web 14 at the critical stage is concerned.

To measure an electrical property of a predetermined and constant area of the web 14 at the critical stage referred to, I cause the web to pass over a guide roller 29 having a metallic surface insulated from the rest of the machine and hence from the ground. A contact 30 connected with a source of electrical energy 31 impresses a constant and known high potential upon the roller 29. The other terminal of the source 31 leads through a suitable potentiometer or similar measuring instrument 32 to the ground 33. The roller 28 need not be particularly treated to connect it with the ground as at 34.

The distances between the rollers 29 and 28 being fixed by virtue of their mountings in the machine, it follows that a known electric current is constantly passed through a predetermined length 35 of the web 14, the length 35 extending from the line of tangency 36 of the web 14 with the roller 29 and the line of tangency 37 of the web 14 with the roller 28. The lines 36 and 37 are parallel, are spaced by a fixed and constant amount, and extend completely across the web between its opposite side edges. Thus, if the width of the web is maintained constant, as it usually is, the current is passed through a constant rectangular area as shown most clearly in Figure 2.

The meter 32 may be used to measure the resistance of this area. The conductivity will of course be due to the moisture distributed over such area. In the manufacture of ordinary four or five-pound paper, and with an ordinary commercial voltage, the resistance of the area referred to will be in the neighborhood of a half million ohms.

Since the amount of moisture in such constant area is directly proportional in a predetermined manner to the amount of pulp distributed over such area, the measurement of the resistance serves as a direct measurement of the weight of paper ultimately to result from such area. Accordingly, I am not only enabled to weight the resultant paper in a continuous manner and without destroying the continuity of the web, but I am also enabled to control and maintain an accurately uniform weight.

The control is preferably accomplished by speeding up or retarding the screen 10. Suitable drive mechanism actuates the entire machine, as is well understood, and where the motive power is furnished by a steam engine I have found it both simple and satisfactory to provide a speed-controlling mechanism which is operable upon the governor of the engine. The driving mechanism has not been illustrated in the drawings because it would serve merely to complicate the latter and because it is well known to those skilled in the art. Through a system of gearing, all of the driving portions of the machine, such as the wire screen and the press rolls, are driven in unison from a source of power such as a steam engine. Nor have I illustrated the speed-controlling mechanism because I do not consider such illustration essential to a full understanding of my invention. I will point out, however, that I have satisfactorily employed a manual control such as a hand wheel, preferably positioned close to the point of continuous measurement, such hand wheel serving upon operation thereof to adjust the governor of the steam engine, thereby easily effecting even small alterations of speed.

In practice, I may either calibrate the meter 32 or I may know from experience that a certain reading thereof must be maintained in order to maintain a predetermined weight of resultant paper. Should the resistance indicated by the meter increase, it is an indication that the amount of water distributed over the measuring area has reduced. This is an equally sure indication that the amount of pulp distributed over such area has similarly reduced. I thereupon slow up the speed of the screen 10 by a slight amount, and I have found that this promptly and effectively restores the proper and desired pulp distribution per length or per area of web. In like manner, I may speed up the screen 10 by a slight amount whenever a reduction in the resistance indicated at the meter 32 shows that the amount of water and hence the amount of pulp, distributed over the measuring area, has exceeded the desired amount.

I might point out that I am not concerned with the accurate efficiency of the heat rolls serving to remove most of the entrained water from the web after it passes the critical stage. So long as such heat treatment is maintained normally efficient in accordance with normal practice and operation, the resultant paper will meet even the accurate requirements of such users as condenser manufacturers.

Similarly, I am not concerned with variations transversely of the web. Such variations may perhaps be due to improper or worn crowning of the rolls or rollers, or they may be due to variations in the felts caused by continued wear of the latter, but such variations in the felts or in the rolls occur at rate times and can be gradually anticipated as the respective parts remain in use for known periods of time. In other words, there are no minute by minute variations transversely of the web as there are minute by minute variations in weight distribution of pulp.

Nor do the slight variations in efficiency of the felts or of the press rolls have any material effect upon the resistance measured at 32. Such variations, like the transverse variations, occur at infrequent intervals and can be remedied in the course of normal operation and practice.

In general, I want to emphasize again that the minute by minute variations in pulp distribution are of far greater importance and are the only variations which alter the resistance by an appreciable amount as measured at the critical stage. Even these variations are exceptionally slight where the constituency of the stock 11 is maintained substantially uniform during the course of normal operation, but slight as they are, they are tremendous in their effect upon the measured resistance, as compared with the effects upon such resistance by variations in efficiency of the mechanical expulsion means.

It will thus be seen that I have provided a method for not only continuously measuring the weight of paper produced during a manufacturing process of the foregoing character, but also for accurately controlling such weight to maintain the same continuously within narrowly delimited requirements. It will be obvious that changes in the details of mechanism and apparatus may be readily made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In the process of manufacturing paper, the herein described method of continuously measuring and controlling the weight per area of the paper produced, which includes the step or steps of continuously forming and advancing a web of stock composed of pulp and excess water, treating said web, first mechanically and then thermically, to gradually diminish the water content thereof, and continuously measuring the electrical resistance of a predetermined area of said web co-extensive in width with the width of the web at that critical stage of treatment where the remaining water content is no longer mechanically removable.

2. In the process of manufacturing paper, the herein described method of continuously measuring and controlling the weight per area of the paper produced, which includes the step or steps of continuously forming and advancing a web of stock of constant width and composed of pulp and excess water, treating said web, first mechanically and then thermically, to gradually diminish the water content thereof, and continuously measuring the electrical resistance of a predetermined area of said web, of predetermined length and coextensive in width with the width of the web, at that crtical stage of treatment where the remaining water content is no longer mechanically removable.

3. In the process of manufacturing paper, the herein described method of continuously measuring and controlling the weight per area of the paper produced, which includes the step or steps of continuously forming and advancing a web of stock composed of pulp and excess water, treating said web, first mechanically and then thermically, to gradually diminish the water content thereof, and continuously measuring the electrical resistance of a predetermined area of said web at that critical stage of treatment where the remaining water content is no longer mechanically removable, said area being defined by the opposite edges of the web and by spaced transverse lines extending between said edges.

4. In the process of manufacturing paper, the herein described method of continuously measuring and controlling the weight per area of the paper produced which includes the step or steps of continuously forming and advancing a web of stock of constant width and composed of pulp and excess water, treating said web, first mechanically and then thermically, to gradually diminish the water content thereof, and continuously measuring the electrical resistance of a predetermined length of said web at that critical stage of treatment where the remaining water content is no longer mechanically removable, said area being defined by the opposite parallel edges of the web and by parallel predeterminedly and substantially spaced transverse lines extending between said edges.

5. The herein described process of manufacturing paper of uniform weight per area, which comprises the step or steps of continuously forming and advancing a web of stock composed of pulp and excess water, treating said web during its advance to mechanically remove all water except that which is retained by the pulp by virtue of the inherent water-carrying capacity of the latter, continuously measuring the electrical resistance of a predetermined area of said web co-extensive in width with the width of the web after said treatment and before any further removal of water, and altering the pulp concentration of said web at the point of formation in direct proportion to said resistance.

6. The herein described process of manufacturing paper of uniform weight per area, which comprises the step or steps of continuously forming and advancing a web of stock composed of pulp and excess water, treating said web during its advance to mechanically remove all water except that which is retained by the pulp by virtue of the inherent water-carrying capacity of the latter, continuously measuring the electrical resistance of a predetermined area of said web co-extensive in width with the width of the web after said treatment and before any further removal of water and altering the speed of travel of said web in inverse proportion to said resistance.

7. In a paper-making apparatus, a moving screen adapted to receive paper stock of pulp and water and to form a continuous web of said stock, means for advancing said web, means for dehydrating the web mechanically during its advance, a set of heated rollers over which the web passes after the mechanical dehydration thereof, a guide roller over which the web passes and immediately in advance of and spaced from said heated set, and means for continuously measuring the electrical resistance of the constant rectangular web area defined by the opposite lateral edges of the web and by the transverse lines of tangency of said web with said guide roller and with the first roller of said heated set, respectively.

8. In a paper-making apparatus, a moving screen adapted to receive paper stock of pulp and water and to form a continuous web of said stock, means for advancing said web, means for dehydrating the web mechanically during its advance, a set of metallic heated rollers over which the web passes after the mechanical dehydration thereof, a metallic guide roller over which the web passes and immediately in advance of and spaced from said heated set, and means for continuously measuring the electrical resistance of the constant rectangular web area defined by the opposite lateral edges of the web and by the transverse lines of tangency of said web with said guide roller and with the first roller of said heated set, respectively; said means including a source of electrical energy and means for electrically connecting the respective opposite terminals of said source with said guide roller and with the first roller of said heated set.

In witness whereof I have signed this specification this 16th day of October, 1928.

LOUIS P. SCHWEITZER.